Patented Oct. 7, 1947

2,428,368

UNITED STATES PATENT OFFICE 2,428,368

AMINES IN THE I-STEROID SERIES

Percy L. Julian, Maywood, and John Wayne Cole and Edwin W. Meyer, Chicago, Ill., assignors to The Glidden Company, Cleveland, Ohio, a corporation of Ohio No Drawing. Application February 11, 1944,
Serial No. 522,031

17 Claims. (Cl. 260—387)

The present invention relates to amines of the steroid series, particularly to i-steroid-amines.

In the preparation of therapeutic materials from steroids by synthetic procedures, considerable difficulty may be encountered in the isolation of desired intermediates or end products. In many instances one encounters a mixture of neutral products, the separation of which requires tedious fractional crystallization, chromatographic adsorption, etc. However, if the desired material possesses a functional group by virtue of which easily separable derivatives can be prepared, the recovery of the desired material is facilitated. Of special value have been steroids containing keto groups, which have been removed by treatment with ketone reagents. Bile acids and acid degradation products of sterols in many cases form insoluble salts and thus the acidic groups are made use of in this case to facilitate separation. Few compounds of the steroid series, however, containing functional groups of basic character have been prepared, this class of steroid compounds provides a new approach in the preparation and separation of valuable compounds in this series.

It is accordingly an object of the present invention to prepare a new type of basic compound of the steroid series.

A further object is to provide a new type of intermediate for the preparation of steroid pharmaceuticals.

An additional object is to prepare a new type of steroid amine.

Another object is to provide a process for the preparation of the aforementioned basic steroids.

Other objects will be apparent to those skilled in the art from the following description of the invention.

The new type of amine with which the present invention is concerned is believed to possess a basic amino or substituted amino group at the $C_6$ position of the steroid nucleus and to further possess a fused cyclo-propane structure involving the 3, 4 and 5 carbon atoms of the steroid molecule. The amines of the present invention are called i-steroid amines by analogy to the i-sterols, i-steroid ethers and ketones, the basic structure of which was first proposed by Wallis, Fernholz and Gephart, J. Am. Chem. Soc. 59, 137 (1937) and later substantiated by others.

They are supposed to possess the structure

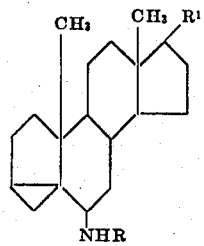

in which R is hydrogen or a hydrocarbon radical and $R^1$ is any group or radical.

The proof of the i-steroid structure of the amines of the present invention was obtained by converting the amines to known compounds possessing the i-steroid structure, and the latter into the corresponding 3-substituted sterol derivatives.

Unlike typical amine hydrochlorides, the hydrochlorides of the amines of the present invention are frequently quite soluble in ether, a fact facilitating their separation and recognition.

In general the i-amines have been formed by reacting a steroid possessing a suitable substituent group in the 3 position and a double bond in the 5,6 position with ammonia or an amine. The substituent groups in the 3 position which have been found most suitable for the production of the i-amines are monovalent radicals which correspond to the anion of a relatively strong acid, such as for example a halogen group, or a paratoluene sulfonoxy group.

The following examples are illustrative.

*Example I.—Benzyl-i-cholesterylamine*

A solution of 10 g. of chloesteryl-p-toluene sulfonate in 20 ml. of freshly distilled benzylamine containing 1 ml. of toluene was refluxed for one and one-half hours. The benzylammonium p-toluene sulfonate which separated (calcd. N=5.02: found N=5.01, 5.02) was filtered and washed well with ether: 4.9 g. melting at 182–184°. The ether filtrate and washings were concentrated, a small quantity of 10% potassium hydroxide was added, and the residue steam distilled. The remaining wax was taken up in ether and the ether solution washed with water. The ether solution was then shaken with 10% hydrochloric acid. A gelatinous precipitate formed which was centrifuged and washed well with ether. The ether washings were filtered and concentrated. The residue after trituration with acetone yielded 4.9 g. of benzyl-i-cholesterylamine hydrochloride melting at 215 to 220° C. Several crystallizations from acetone-chloroform produced white crystalline material melting at 218.5–219.5° C.

Anal. calcd. for $C_{34}H_{54}NCl \cdot \tfrac{1}{2}H_2O$: C, 78.36; H, 10.65. Found: C, 78.21; H, 10.66.

The free base as produced by the decomposition of the hydrochloride with alkali is a water-white syrup.

Example II.—Cyclohexyl-i-cholesterylamine

A solution of 10 g. of cholesteryl p-toluene sulfonate in 20 ml. of cyclohexylamine was refluxed for one and one-half hours. The major portion of the unreacted cyclohexyl-amine was then removed in vacuo and absolute ether was added to the residue. The separated cyclohexyl ammonium p-toluene sulfonate was filtered and washed with ether; 5.2 g. (theory=5.2 g.). The ether filtrate was concentrated, 3% sodium hydroxide added and the mixture steam distilled. The remaining yellow gum was taken up in ether, washed with water and shaken with 10% hydrochloric acid. The white gelatinous precipitate was centrifuged and washed well with ether. The filtrate and ether washings of the solid were filtered, concentrated and the residue crystallized from acetone. There resulted 3.4 g. of white crystalline material melting at 210° C. Crystallization from acetone gave material melting at 209–211° C.

Anal. calcd. for $C_{33}H_{58}NCl$: N, 2.77. Found: N, 2.55. Rotation $[\alpha]_D^{25}+33.1°$ (in ethanol).

The free base obtained from the hydrochloride through alkaline treatment is a water-white syrup.

Example III.—Preparation of benzyl-i-cholesterylamine in benzene solution

A solution of 10.0 g. of cholesteryl p-toluenesulfonate and 20 ml. of benzylamine in 50 ml. of benzene was refluxed for six hours. The solution was poured into an excess of ether for the separation of benzylammonium p-toluenesulfonate. This salt, after washing well with ether and drying, weighed 4.2 g. The ether filtrate and washings were concentrated, a small volume of 10% sodium hydroxide added, and the mixture steam distilled. The yellow residue was dissolved in ether and the ether solution was washed with water and shaken with 10% hydrochloric acid. The gelatinous precipitate was centrifuged and washed with ether. The combined ether washings were washed with water, filtered and concentrated. The residue upon trituration with acetone, yielded 4.9 g. of benzyl-i-cholesterylamine hydrochloride melting at 218–220° C.

The free base was liberated from the salt with 10% sodium hydroxide. It was a colorless syrup.

Example IV.—i-Cholesterylamine

A mixture of 15 g. powdered cholesteryl p-toluenesulfonate, and 3 grams ammonium sulfate was cooled to −40° and covered with 18 grams of liquid ammonia. The mixture was sealed in a steel bomb, and heated in an oil bath at 100° C. for 20 hours. The ammonia was then evaporated, and the white residue shaken with ether and 5% sodium hydroxide. The clear ether solution was washed with water then shaken with an excess of 5% hydrochloric acid, giving a gelatinous precipitate. This precipitate was separated by centrifuging, then washed with ether. The ether solution was concentrated to 25 cc., treated with 50 cc. of acetone, then crystallized by evaporation. The crystalline product was separated and washed with acetone, giving 7.5 grams of crude 1-cholesterylamine hydrochloride melting at 212–214°, and giving $[\alpha]_D^{29}+20$ (in chloroform).

Analyses: Calcd. for $C_{27}H_{45}N \cdot HCl$: 3.32% N. Found: 3.20% N.

The hydrochloride of the i-amine is soluble in ether, benzene, or alcohol, but is insoluble in water or acetone. The free base which is obtained by shaking the ether solution of the hydrochloride with 5% sodium hydroxide solution is a colorless syrup.

Example V.—1,1-diphenyl-2-methyl-2[6-amino-i-etiocholenyl]-ethylene 10 grams of powdered 3-p-toluene sulfonoxy-22,22-diphenyl-5,20-bisnorcholadiene was covered with 23.3 grams of liquid ammonia. This mixture was sealed in a steel bomb, and heated in an oil bath at 90° C. for 20 hours. The ammonia was allowed to evaporate and the white, solid residue was shaken with ether and water. The ether solution was washed with water and then treated with a dilute solution of hydrochloric acid. The solid which formed was separated and the clear ether solution containing the hydrochloride of 1,1-diphenyl-2-methyl-2-[6-amino-i-etiocholenyl) ethylene was shaken with dilute sodium hydroxide to liberate the free base. The ether solution of the free base was washed with water, dried and concentrated yielding 5.7 grams of crude amine.

In place of the diphenyl ethylenes, ethylenes in which one or both of the phenyl groups are replaced by hydrogen or other hydrocarbon radicals may be used.

Example VI.—Benzyl-i-cholesterylamine from cholesteryl bromide

A solution of 10 grams of cholesteryl bromide in 20 ml. of benzylamine was refluxed for two hours and then diluted with ether. The solid benzyl ammonium bromide was separated and washed with ether. The combined ether filtrate was concentrated, a few ml. of 10% potassium hydroxide added, and the mixture steam distilled. The oily residue was taken up in ether and washed with water. The ether solution was shaken with 10% hydrochloric acid, the gelatinous precipitate separated, and the ether layer dried. Upon removal of solvent, a waxy residue remained. Trituration of the residue with acetone yielded 2.5 grams of crude benzyl-i-cholesterylamine hydrochloride, a white solid. Several crystallizations from chloroform-acetone yielded hydrochloride melting at 219–221° C.

Example VII.—Proof of i-amine structure

An ether solution of i-cholesterylamine resulting from the decomposition of 1.05 g. of the amine hydrochloride prepared according to Example IV was treated with an ether solution of hypochlorous acid containing sufficient acid to form the mono-chloramine. After completion of reaction, the ether solution was washed with 5% sodium hydroxide solution, followed by water and dried. The dry solution was added to a solution of sodium ethoxide prepared from 0.5 g. of sodium and 25 ml. of absolute ethanol. The ether was removed by distillation and the residual solution warmed on the steam bath for thirty minutes. The mixture was diluted with 100 ml. of cold water and made slightly acidic with dilute hydrochloric acid. After hydrolysis of the imine, the mixture was extracted with ether. The residue from the dry ether solution containing i-cholestenone was dissolved in 10 ml. of glacial acetic acid and 2 ml. of concentrated hydrochloric acid added thereto. The crystalline material which separated weighed 0.502 g. After one crystallization from ethanol, the product melted at 130–133° and showed no depression when mix melted with an authentic sample of 3-(α)-chloro-6-cholestanone.

Having described the invention what is claimed is:

1. Amines of the general formula

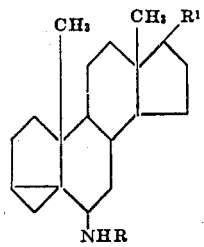

in which R is selected from the class consisting of hydrogen and hydrocarbon radicals, and $R^1$ is a hydrocarbon radical.

2. i-Cholesteryl-6-amines.

3. A compound according to claim 2 in which the 6 amine group is $NH_2$.

4. 6-amines of 2-methyl 2-[i-etiocholenyl] ethylenes.

5. 6-amines of 1,1-diphenyl-2-methyl-2-[i-etiocholenyl] ethylene.

6. 1,1-diphenyl-2-methyl-2-[6-amino-i-etiocholenyl] ethylene.

7. The process which comprises reacting a $\Delta^{5,6}$ steroid containing in the 3-position a monovalent radical corresponding to the anion of a relatively strong acid with an amino compound selected from the class consisting of ammonia and amines, forming a solution of the resulting steriod amine in a solvent in which the salt is soluble, converting the amine in solution into a salt, and separating the i-steroid amine salt from insoluble material formed.

8. The process which comprises reacting a $\Delta^{5,6}$ steroid containing in the 3-position a monovalent radical corresponding to the anion of a relatively strong acid with an amino compound selected from the class consisting of ammonia and amines, forming a solution of the resulting steroid amine in a solvent in which the hydrochloride is soluble, converting the amine to the hydrochloride, and separating the i-steroid amine hydrochloride from insoluble material formed.

9. The process which comprises reacting a $\Delta^{5,6}$ steroid containing in the 3-position a monovalent radical corresponding to the anion of a relatively strong acid with ammonia, forming a solution of the resulting steroid amine in a solvent in which the hydrochloride is soluble, converting the amine to the hydrochloride, and separating the i-steroid amine hydrochlorine from the insoluble material formed.

10. The process which comprises reacting a $\Delta^{5,6}$ steroid containing in the 3-position a monovalent group corresponding to the anion of a relatively strong acid with an amine, forming a solution of the resulting steroid amine in a solvent in which the hydrochloride is soluble, converting the amine to the hydrochloride, and separating the i-steroid amine hydrochloride from the insoluble material formed.

11. The process which comprises reacting a 3-para-toluenesulfonoxy $\Delta^{5,6}$ steroid with an amine compound selected from the class consisting of ammonia and amines, forming a solution of the resulting amine in a solvent in which the hydrochloride is soluble, converting the amine into the hydrochloride, and separating the i-amine hydrochloride from the insoluble material formed.

12. The process which comprises reacting a 3-bromo $\Delta^{5,6}$ steroid with an amino compound selected from the class consisting of ammonia and amines, forming a solution of the resulting steroid amine, converting the amine in a solvent in which the hydrochloride is soluble into its hydrochloride, and separating the i-amine from the insoluble material formed.

13. The process which comprises reacting a $\Delta^{5,6}$ steroid containing a substituent group selected from the class consisting of the para-toluenesulfonoxy group and a halide group in the 3-position with an amino compound selected from the class consisting of ammonia and amines, forming an ether solution of the resulting steroid amine, converting the amine into its hydrochloride, separating the i-steroid amine hydrochloride from the insoluble material formed, and recovering the i-steroid amine from the hydrochloride.

14. The process which comprises reacting a $\Delta^{5,6}$ steroid containing in the 3-position a monovalent group corresponding to the anion of a relatively strong acid, with an amino compound compound selected from the class consisting of ammonia and amines, forming a solution of the resulting steroid amine in a solvent in which the hydrochloride is soluble, converting the amine into its hydrochloride, separating the solution containing the i-steroid amine hydrochloride from insoluble material formed, and recovering the i-steroid amine from the solution.

15. The process of claim 7 in which the steroid treated with the amino compound is a cholesteryl compound.

16. The process of claim 7 in which the steroid treated with the amino compound is a derivative of a 2-methyl-3-[$\Delta^{5,6}$-etiocholenyl] ethylene.

17. The process of claim 7 in which the steroid treated with the amine is a derivative of 1,1-diphenyl-2-methyl-2-[$\Delta^{5,6}$-etiocholenyl] ethylene.

PERCY L. JULIAN.
JOHN WAYNE COLE.
EDWIN W. MEYER.

REFERENCES CITED

The following references are of record in the file of this patent:

UNITED STATES PATENTS

| Number | Name | Date |
| --- | --- | --- |
| 2,228,496 | Windaus | Jan. 14, 1941 |

Certificate of Correction

Patent No. 2,428,368.  October 7, 1947.

PERCY L. JULIAN ET AL.

It is hereby certified that error appears in the printed specification of the above numbered patent requiring correction as follows: Column 5, line 67, claim 9, for "hydrochlorine" read *hydrochloride*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*